United States Patent [19]
Fujitani et al.

[11] Patent Number: 5,728,483
[45] Date of Patent: Mar. 17, 1998

[54] SYSTEM FOR STORING AND UTILIZING HYDROGEN

[75] Inventors: Shin Fujitani, Hirakata; Koichi Nishimura, Suita; Koichi Sato, Hirakata; Ikuo Yonezu, Hirakata; Koji Nishio, Hirakata, all of Japan

[73] Assignee: Sanyo Electric Co., Ltd., Osaka, Japan

[21] Appl. No.: 822,065

[22] Filed: Mar. 24, 1997

[30] Foreign Application Priority Data

Mar. 26, 1996 [JP] Japan ............... 8-070611

[51] Int. Cl.$^6$ ....................... H01M 8/04
[52] U.S. Cl. ............... 429/12; 429/19; 429/26
[58] Field of Search ................ 429/12, 17, 19, 429/26, 34, 120, 101

[56] References Cited

U.S. PATENT DOCUMENTS

| | | | |
|---|---|---|---|
| 4,988,580 | 1/1991 | Ohsaki et al. | 429/19 |
| 5,250,368 | 10/1993 | Golben et al. | 429/17 |
| 5,527,632 | 6/1996 | Gardner | 429/27 |

FOREIGN PATENT DOCUMENTS

| | | |
|---|---|---|
| 5139423 | 4/1976 | Japan . |
| 62-246698 | 10/1987 | Japan . |
| 63-121266 | 5/1988 | Japan . |
| 2106880 | 4/1990 | Japan . |
| 3034260 | 2/1991 | Japan . |
| 6293290 | 10/1994 | Japan . |

OTHER PUBLICATIONS

Y. Nakamura et al., "Characteristics of a hydrogen-absorbing alloy developed for a portable fuel cell", International Hydrogen and Clean Energy Symposium 1995, pp. 287–290. No month.

*Primary Examiner*—Anthony Skapars
*Attorney, Agent, or Firm*—Loeb & Loeb LLP

[57] ABSTRACT

The invention provides a system for storing and utilizing hydrogen comprising a liquefied hydrogen storage container 1 to be filled with liquefied hydrogen 2, a fuel cell 5 operable by a supply of hydrogen gas and serving as a hydrogen utilizing device, hydrogen gas piping 37 interconnecting the storage container 1 and the fuel cell 5, a hydrogen absorbing alloy container 3 connected to an intermediate portion of the piping 37 and having a hydrogen absorbing alloy 4 accommodated therein, a heat accumulator 6 having a heat storage medium 7 accommodated therein, piping 25 and a pump 22 for circulating the heat storage medium 7 between the fuel cell 5 and the heat accumulator 6, and piping 24 and a pump 21 for circulating the heat storage medium between the alloy container 3 and the heat accumulator 6.

7 Claims, 1 Drawing Sheet

1

SYSTEM FOR STORING AND UTILIZING HYDROGEN

FIELD OF THE INVENTION

The present invention relates to systems for storing and utilizing hydrogen as an energy source.

BACKGROUND OF THE INVENTION

Clean hydrogen energy has attracted attention in recent years in view of the depletion of fossil fuels such as petroleum and global environmental problems arising from increased quantities of carbon dioxide gas. Actual use of hydrogen in energy systems substituting for current electric power systems inevitably requires development of systems for economically producing, transporting, storing and utilizing hydrogen with safety for use as a fuel. Hydrogen appears especially advantageous to transport and store when liquefied from the viewpoint of the lightweightness and compactness of liquefied hydrogen.

However, liquefied hydrogen has an extremely low boiling point of $-252.9°$ C. and therefore readily evaporates, such that when stored in the ordinary storage condition, liquefied hydrogen vaporizes at a rate of about 1% a day to become dissipated in the atmosphere as boil-off hydrogen gas. Further when to be filled into a storage container, liquefied hydrogen vaporizes in an amount as large as about 10% of the container capacity, becoming dissipated in the atmosphere as so-called flash hydrogen gas. Thus, liquefied hydrogen is not suited to transport or storage over a prolonged period of time in view of safety and economy.

Accordingly, attempts are made to store and transport liquefied hydrogen gas more economically with higher safety and improved reliability with use of a hydrogen absorbing alloy which is reversibly reactive with a large amount of hydrogen to absorb or desorb hydrogen and which serves as an auxiliary storage medium for absorbing and storing boil-off hydrogen gas as disclosed, for example, in JP-A-39423/1976 and JP-A-293290/1994.

With hydrogen absorbing alloys, the pressure (equilibrium hydrogen pressure) on which whether the alloy absorbs or desorbs hydrogen is dependent varies greatly with the temperature of the alloy. The hydrogen absorption or desorption rate also varies greatly with variations in the pressure. Especially because the desportion of hydrogen is endothermic, the desorption reaction comes to a halt unless this reaction heat is given by suitable means. JP-A-121266/1988 therefore discloses use of the heat released from a hydrogen utilizing device, i.e., a fuel cell, for heating a hydrogen absorbing alloy.

However, the liquefied hydrogen storage apparatus equipped with a hydrogen absorbing alloy as an auxiliary storage medium, and hydrogen storing and utilizing systems comprising a fuel cell or like hydrogen utilizing device have no heat accumulating function. Consequently, extreme difficulties are encountered in storing and utilizing hydrogen effectively with safety, in accordance with the operating load of the fuel cell and the rate of vaporization of hydrogen from liquefied hydrogen.

The demand for electric power differs greatly in the daytime and in the nighttime, so that if a heat exchanger is merely provided between the hydrogen absorbing alloy container and the fuel cell or like hydrogen utilizing device, boil-off hydrogen gas will be evolved in an amount exceeding the hydrogen storage capacity of the alloy container during the nighttime of diminished power demand or when the atmospheric temperature rises markedly during the daytime in summer, hence a need to discard an excess of boil-off hydrogen gas. Furthermore, the apparatus has no function of rapidly and stably absorbing and storing flash hydrogen gas which is released in a large quantity when liquefied hydrogen is filled into the hydrogen storage container, with the result that the gas must inevitably be disposed of. Although the hydrogen absorbing alloy container may be made to accommodate an increased amount of hydrogen absorbing alloy so as to assure the alloy container of a sufficient hydrogen storage capacity and a satisfactory hydrogen absorption rate, the apparatus then inevitably becomes greater in size and requires an increased equipment cost.

When hydrogen absorbing alloys absorb flash hydrogen gas or boil-off hydrogen gas, the alloy produces reaction heat with a value of about 30 kJ per mole of hydrogen gas. This value is as great as about 10% of the heat of combustion of hydrogen (286 kJ per mole of hydrogen gas). Nevertheless, conventional hydrogen storage systems comprising the combination of a liquefied hydrogen storage device and a hydrogen absorbing alloy container are unable to collect and utilize the reaction heat and therefore fail to utilize hydrogen energy efficiently.

Whereas fuel cells permit dual-purpose electricity and steam generation with a high efficiency and are very useful for meeting an energy demand in cities and suburbs, it has been extremely difficult to actually use fuel cells as hydrogen storage devices and hydrogen utilizing devices from the viewpoints of safety, reliability and economy.

SUMMARY OF THE INVENTION

An object of the present invention, which has been accomplished in view of the foregoing problems, is to provide a hydrogen storing and utilizing system which has incorporated therein a hydrogen absorbing alloy for absorbing flash hydrogen gas or boil-off hydrogen gas to be released from liquefied hydrogen and which is adapted to effectively utilize the resulting heat of reaction.

Another object of the present invention is to provide a system for storing and utilizing hydrogen with a high energy efficiency.

Another object of the invention is to provide a hydrogen storing and utilizing system whereby a fuel cell, permitting efficient generation of electricity and steam, is made usable to meet an energy demand in cities and suburban areas.

The present invention provides a system for storing and utilizing hydrogen which comprises a liquefied hydrogen storage container to be filled with liquefied hydrogen, a hydrogen utilizing device operable by a supply of hydrogen gas, hydrogen gas piping interconnecting the hydrogen storage container and the hydrogen utilizing device, a hydrogen absorbing alloy container connected to an intermediate portion of the hydrogen gas piping and having a hydrogen absorbing alloy accommodated therein, a heat accumulator having a heat storage medium accommodated therein, first medium circulating means for circulating the heat storage medium between the hydrogen utilizing device and the heat accumulator, and second medium circulating means for circulating the heat storage medium between the alloy container and the heat accumulator.

When liquefied hydrogen is filled into the storage container of the system described, the flash hydrogen gas then produced is supplied to the hydrogen absorbing alloy container. After the storage container has been filled with liquefied hydrogen, the hydrogen gas produced from the alloy container is supplied to the hydrogen utilizing device.

or the boil-off hydrogen gas produced from the storage container is supplied to the alloy container, depending on the relationship between the rate of production of boil-off gas from the storage container and the rate of hydrogen gas demand of the hydrogen utilizing device, i.e., depending on which of these rates is greater.

Stated more specifically, the present invention provides a system for storing and utilizing hydrogen which comprises a hydrogen storage device and a hydrogen utilizing device interconnected by hydrogen gas piping 37. The hydrogen storage device comprises a hydrogen absorbing alloy container 3, and a hydrogen absorbing alloy 4 accommodated in the alloy container for absorbing flash hydrogen gas to be produced when liquid hydrogen is filled into a liquefied hydrogen storage container 1 and boil-off hydrogen gas to be produced from the storage container 1 after the container 1 has been filled with the liquefied hydrogen. The system further comprises a heat accumulator 6 having a heat storage medium 7 accommodated therein, a first heat exchanger 9 installed in the hydrogen utilizing device, a first piping channel for circulating the heat storage medium 7 between the first heat exchanger 9 and the heat accumulator 6, a second heat exchanger 8 installed in the alloy container 3, a second piping channel for circulating the heat storage medium 7 between the second heat exchanger 8 and the heat accumulator 6, a third piping channel connected to the second piping channel for introducing a heat storage medium of low temperature into the second piping channel, and a fourth piping channel connected to the heat accumulator 6 for introducing the heat storage medium of low temperature into the heat accumulator 6.

It is most suitable that the heat storage medium 7 be water. Suitable hydrogen utilizing devices 5 are fuel cells and/or hydrogen combustion devices. The hydrogen absorbing alloy 4 is preferably one having an equilibrium hydrogen pressure of up to 1 MPa at 40° C. The equilibrium hydrogen pressure may be made higher than atmospheric pressure at 100° C. or at the temperature level of the heat released from the hydrogen utilizing device 5.

With the hydrogen storing and utilizing system of the invention, heat exchange is effected between the hydrogen absorbing alloy within the alloy container 3 and the hydrogen utilizing device by the heat accumulator 6, so that when the liquefied hydrogen filling procedure releases flash hydrogen gas or when boil-off hydrogen gas is produced in an amount greater than is demanded by the hydrogen utilizing device, the heat evolved by supplying the flash hydrogen gas or the boil-off hydrogen gas to the alloy container 3 is transported from the heat exchanger 8 to the heat accumulator 6 and stored in the accumulator. Further when the demand of the hydrogen utilizing device for hydrogen gas is small, the excessive heat produced by the supply of hydrogen gas to the hydrogen utilizing device is transported from the heat exchanger 9 to the heat accumulator 6 and stored in the accumulator. The heat of the heat accumulator 6 is effectively utilized as reaction heat for the hydrogen absorbing alloy 4 when the alloy container 3 supplies hydrogen gas to the hydrogen utilizing device.

Consequently, the flash hydrogen gas produced when liquefied hydrogen is filled in and the boil-off hydrogen gas produced after the hydrogen has been filled in can be stored and utilized with good stability using a hydrogen absorbing alloy container of minimized hydrogen storage capacity required, in conformity with the scale of liquefied hydrogen storage and the scale of demand for hydrogen gas.

DETAILED DESCRIPTION OF EMBODIMENT

Figure 1:
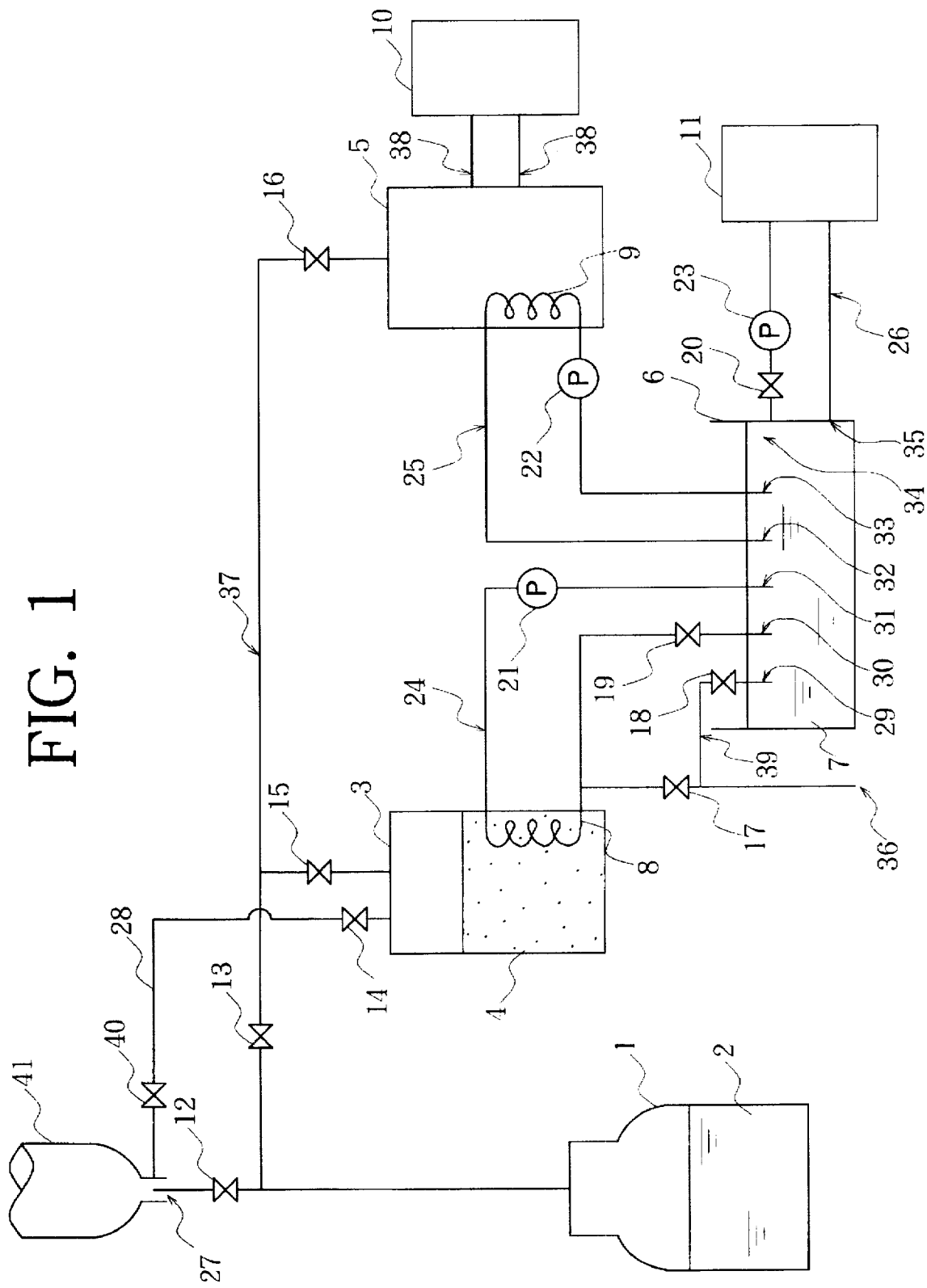
FIG. 1 is a diagram showing the construction of a system of the invention for storing and utilizing hydrogen.

An example of system of the invention for storing and utilizing hydrogen will be described with reference to FIG. 1. FIG. 1 shows a container 1 for storing liquefied hydrogen. Flash hydrogen gas is produced when liquefied hydrogen is filled into the storage container 1. Further boil-off hydrogen gas is produced from the storage container 1 as filled with liquefied hydrogen. A hydrogen absorbing alloy 4 is used as accommodated in a hydrogen absorbing alloy container 3 for absorbing these hydrogen gases. With the present embodiment, the combination of the alloy 4 and the alloy container 3 is termed a "hydrogen storage device."

A fuel cell 5 serving as a hydrogen utilizing device and the hydrogen storage device are interconnected by hydrogen gas piping 37 to provide the system for storing and utilizing hydrogen. The system has the first to fourth piping channels to be described below.

First piping channel: for circulating a heat storage medium 7 between a heat accumulator 6 and a heat exchanger 9 for effecting heat exchange between the hydrogen utilizing device 5 and the heat accumulator 6 using the medium 7.

Second piping channel: for circulating the heat storage medium 7 between the heat accumulator 6 and a heat exchanger 8 disposed within the alloy container 3.

Third piping channel: connected to the second piping channel for introducing a heat storage medium of low temperature into the second piping channel.

Fourth piping channel: connected to the heat accumulator 6 for introducing the low-temperature heat storage medium into the accumulator 6.

The present invention will be described in greater detail. A known liquefied hydrogen tank 41 loaded, for example, on a tank truck is connected to the storage container 1 of the hydrogen storage device to fill liquefied hydrogen 2 from the tank 41 into the storage container 1.

The alloy container 3 equipped with the heat exchanger 8 is packed with the hydrogen absorbing alloy 4. Usable as the heat exchanger 8 is one having a known construction as disclosed, for example, in JP-A-59202/1989.

Stated specifically, the fuel cell 5 equipped with the heat exchanger 9 serves as the hydrogen utilizing device. The cell generates electricity using hydrogen as a fuel and supplies electric power to an electric load 10 such as an electric lamp through transmission lines 38. The fuel cell 5 is not limited specifically in type but can be of the phosphoric acid type, fused carbonate type or solid electrolyte type, or one having an electrolyte of solid high polymer membrane. The heat exchanger can be of a known construction (see, for example, JP-A-106880/1990).

The storage container 1, alloy container 3 and fuel cell 5 are connected to one another by hydrogen gas piping 37 by way of valves 13, 15 and 16. The storage container 1 has a liquefied hydrogen inlet 27 with a valve 12 provided therebetween. The flash hydrogen gas produced when liquefied hydrogen is filled into the storage container 1 from the tank 41 is supplied to the alloy container 3 through a flash hydrogen conduit 28 having valves 40, 14.

The heat exchanger 8 disposed in the alloy container 3 is connected to the heat accumulator 6 containing the heat storage medium 7 by heat medium piping 24 having a pump 21 and a valve 19. The piping 24 has opposite ends immersed in the medium 7 of the accumulator 6 and providing a medium inlet 30 and a medium outlet 31. A heat medium pipe 39 having a medium inlet 36 is connected via a valve 18 to the heat accumulator 6 and has an end immersed in the heat storage medium 7 and providing a medium outlet 29. The inlet 36 is connected via a valve 17 to the piping 24 at the inlet side of the heat exchanger 8 installed in the alloy container 3. Through the arrangement described, the heat storage medium admitted into the inlet 36 flows through the heat exchanger 8 in the alloy container 3 and is supplied to the heat accumulator 6 through the outlet 31.

The medium inlet 30, valve 19, heat exchanger 8, heat medium piping 24, pump 21 and medium outlet 31 provide the second piping channel.

The heat exchanger 9 installed in the fuel cell 5 is connected to the heat accumulator 6 by heat medium piping 25 equipped with a pump 22. The piping 25 has opposite ends immersed in the heat storage medium 7 of the accumulator 6 and providing a medium inlet 32 and a medium outlet 33.

The medium inlet 32, heat medium piping 25, heat exchanger 9, pump 22 and medium outlet 33 provide the first piping channel.

A thermal load 11 such as a hot water supply load is connected via a pump 23 and valve 20 to the heat accumulator 6 by heat medium piping 26. The piping 26 has opposite ends providing a medium inlet 35 and a medium outlet 34.

Next, a description will be given of an example of hydrogen storing and utilizing system of the type described and as adapted to supply energy for a housing complex comprising 100 houses.

First the scale of load and the amount of hydrogen to be stored. Statistics indicate that the total quantity of electric power demanded for electric lamps throughout the year in Japan is 182,909×106 kWh. This value corresponds to 16.7 kWh/day when calculated for each family of four per day. The amount of town gas demanded per family is 14 kWh/day.

Accordingly, it can be assumed that the daily electric power load and thermal load per family are 20 kWh/(day, family) and 20 kWh/(day, family), respectively. Further assuming that the power generation efficiency and heat utilization efficiency of the fuel cell are 40.0% and 50.0%, respectively, which are typical of phosphoric acid fuel cells, the amount of hydrogen daily required for the complex of 100 houses is 1,500 Nm³ (1,800 liters of liquefied hydrogen)- Now, suppose the liquefied hydrogen transport or filling cycle is 15 days. The amount of hydrogen to be stored is then 23,000 Nm³ (27,100 liters of liquefied hydrogen). The heat released by the fuel cell is 22,500 kWh in the case where the power generation efficiency is 40.0% and the heat utilization efficiency is 50.0%, whereby a thermal load of 30,000 kWh can be supported.

Next, a description will be given of the performance and specifications of the system of the invention in conformity with the load scales stated above. First, the quantities of flash hydrogen gas and boil-off hydrogen gas produced from the liquefied hydrogen storage container 1 having a scale of 30,000 liters of liquefied hydrogen are 10 vol. %/charge and 1 vol. %/day, respectively. The load working ratio attained by the boil-off hydrogen gas is 80%. Consequently, the amount of liquefied hydrogen stored is 23,000 Nm³ (27,100 liters of liquefied hydrogen), and the amount of hydrogen gas stored in the alloy container 3 absorbing the flash hydrogen gas is 2,300 Nm³.

The hydrogen absorbing alloy 4 to be used is known LaNi₅ alloy having a hydrogen storage capacity of 1 to 1.5 wt. %. The fuel cell 5 to be used is a phosphate fuel cell capable of recovering released heat of about 80° C. With the fuel cell 5 given a power generation scale of 300 kW, water is used as the heat storage medium 7, such that water having a temperature of 20° C. is heated with the exhaust heat of the fuel cell 5 to the exhaust heat temperature level of the cell 5, i.e., 80° C., to store the heat in the accumulator 6 and to maintain the operation of the thermal load 11, for example, for supplying hot water. The quantity of heat to be accumulated is 19,332,000 kJ corresponding to the total quantity of exhaust heat which can be utilized effectively. Water is herein used as the heat storage medium 7 because water is inexpensive, has a great heat capacity and can be supplied as it is to the thermal load 11 for the supply of hot water, hence many advantages. In the case where the exhaust heat temperature of the fuel cell 5 is not lower than 100° C., pressurized water or oil is usable as the heat storage medium 7.

Table 1 shows the particulars of components of the system which are determined according to the foregoing basic conditions with consideration given to the construction of the actual system including pressure-resistant containers, heat storage medium container, etc. The amount of LaNi₅ alloy used is about 19 tons.

TABLE 1

| | Liquefied hydrogen storage | Alloy storage | Fuel cell | Heat storage water layer |
|---|---|---|---|---|
| Capacity | 23,000 Nm³ | 2,300 Nm³ | 300 kW (output) | 19,332,000 kJ |
| Weight (kg) | 27,100 | 27,000 | 40,500 | 386,400 |
| Volume (m³) | 117 | 10.2 | 115 | 386 |

As a result, the overall system including the liquefied hydrogen storage container 1, hydrogen absorbing alloy container 3 and fuel cell 5 is 242 m³ in volume and 94,600 kg in weight. Assuming that these components have an average height of about 3 m, the installation area of the system is approximately 9 m square, so that the system can be installed in the housing complex with a scale of 100 houses. Assuming that the heat accumulator 6 is about 2 m in the depth of water, the installation space therefor is approximately 10 m×20 m, and the accumulator is so sized that it can be provided as an underground water tank.

Usable as hydrogen absorbing alloys 4 are hydrogen absorbing alloys, which have a CaCu₅-type structure and typical of which is LaNi₅, Laves-phase hydrogen absorbing alloys, which have a MgZn₂-type structure and typical of which are ZrMn₂, TiMn₂, and Mg₂Ni, CsCl-type hydrogen absorbing alloys typical of which are TiFe and TiCo, and hydrogen absorbing alloys which are improved in hydrogen absorption-desorption characteristics by incorporating other components into such alloys. Among the characteristics of the alloy 4 to be used, the equilibrium hydrogen pressure and the amount of hydrogen absorption are especially important as the factors determining the amount of the alloy relating to the equipment cost and determining the hydrogen absorption, storage and desportion pressures relating to safety and reliability. From such a viewpoint, a detailed description will be given of the properties of alloys which enable the present system to exhibit its advantages more effectively.

The desired equilibrium hydrogen pressure is not higher than the level which assures usual pressure-resistant containers of reliability, i.e. up to 1 MPa, at 40° C. corresponding to the highest possible temperature during the daytime in summer. This permits the hydrogen storing and utilizing system of the invention to find wider use under weather conditions of increased severity. Examples of such hydrogen absorbing alloys are the above-mentioned $LaNi_5$ alloy, $CaNi_5$ alloy, TiCo alloy, $ZrMn_2$ alloy, $Mg_2Ni$ alloy and hydrogen absorbing alloys prepared by adding other components to the composition of such an alloy to thereby given improved characteristics.

It is also desired that the equilibrium hydrogen pressure of the alloy 4 exceed atmospheric pressure at 100° C. Water having various advantages as the heat storage medium 7 is then used for heating the hydrogen absorbing alloy 4. It becomes possible to supply the stored hydrogen to the fuel cell 5 or like hydrogen utilizing device with good stability and improved reliability. Examples of hydrogen absorbing alloys usable for this purpose are the above-mentioned $LaNi_5$ alloy, $CaNi_5$ alloy, TiFe alloy, and hydrogen absorbing alloys prepared by adding other components to the composition of such an alloy to thereby given improved characteristics.

Further in the case where the temperature level of the exhaust heat of the fuel cell 5 is not lower than 100° C., it is desired that the equilibrium hydrogen pressure of the hydrogen absorbing alloy 4 be in excess of atmospheric pressure at the exhaust heat temperature level of the hydrogen utilizing device. It is then possible to use a solid electrolyte fuel cell or fused carbonate fuel cell 5 permitting recovery of exhaust heat, for example, of not lower than 300° C., and to use as the alloy 4 MgNi alloy or the single element Mg which absorbs at least about 3 times as much hydrogen as $LaNi_5$ alloy. The alloy is then heated, for example, with an oil serving as the heat storage medium 7, whereby the hydrogen stored can be supplied with good stability to the fuel cell 5 or like hydrogen utilizing device at a pressure not lower than atmospheric pressure. This results in improved reliability, reduces the amount of alloy to be used to lower the equipment cost, and renders the system compact and usable for wider application. From this viewpoint, a hydrogen combustion device capable of producing a high temperature of not lower than 300° C. at all times can be used as a hydrogen utilizing device in combination with the fuel cell.

Liquefied hydrogen is stored and utilized by the methods to be described below. Liquefied hydrogen transported as by a tank truck is filled into the storage container 1 through the hydrogen inlet 27. The flash hydrogen gas produced at this time is led into the alloy container 3 through the conduit 28 and absorbed by the hydrogen absorbing alloy 4. It is desirable prior to this procedure to operate the fuel cell 5 with the hydrogen stored in the alloy 4 so as to render the alloy 4 free from hydrogen almost completely.

At this time, the valves 12 and 13 are completely closed with the valve 14 opened to a full extent. While the fuel cell 5 is in operation, the valves 15 and 16 are adjusted in the degree of opening so as to supply hydrogen in accordance with the load. The valve 17 is fully opened with the valve 19 completely closed so that the heat storage medium 7 having room temperature and admitted into the inlet 36 is passed through the heat exchanger 8 disposed in the alloy container 3 and is then supplied to the heat accumulator from the outlet 31 in order to recover the flash hydrogen gas and the heat of reaction for heat storage. The valves 12 and 14 are completely closed when the container 1 is filled up with liquefied hydrogen. Consequently, as much as 800 kWh of heat is stored effectively.

The flash hydrogen gas was inevitably discarded conventionally, failing to effectively utilize such heat.

The liquefied hydrogen thus stored is used for driving the fuel cell 5 to supply electric power and heat to the electric load 10 and thermal load 11 by the methods to be described blow.

(1) When the power and heat demands of the loads exceed the rate of production of boil-off hydrogen gas.

This is a case wherein the power demand is at a peak owing to air-conditioning load, etc. during the daytime. In this case, hydrogen gas is supplied from the storage container 1 and the alloy container 3 to the fuel cell 5 with the valves 13, 15 and 16 opened fully.

At this time, the heat storage medium 7 in the accumulator 6 is circulated through the heat exchanger 8 within the alloy container 3 by way of the medium inlet 30 and the medium outlet 31, with the valve 17 completely closed and with the valve 19 fully opened, whereby the alloy 4 is heated and thereby caused to desorb hydrogen gas.

(2) When the power and heat demands of the loads are in conformity with the rate of generation of boil-off hydrogen gas.

With the valves 13 and 16 fully opened in this case, hydrogen gas is supplied from the storage container 1 to the fuel cell 5.

The valves 17 and 19 are completely closed at this time, preventing the hydrogen gas desorption and absorption of the alloy 4.

(3) When the power and heat demands of the loads are lower than the rate of generation of boil-off hydrogen gas.

In this case of diminished load as in the nighttime, the valves 13, 15 and 16 are fully opened to supply hydrogen gas from the storage container 1 to the alloy container 3 and the fuel cell 5.

Since the alloy in the container 3 absorbs boil-off hydrogen gas and releases heat at this time, the valve 17 is fully opened with the valve 19 completely closed so that the heat storage medium 7 having room temperature and admitted through the inlet 36 is passed through the heat exchanger 8 in the alloy container 3 and supplied to the accumulator 6 from the outlet 31 in order to accumulate the heat.

(4) When the power and heat demands of the loads are lower than the rate of generation of boil-off hydrogen gas, with the storage capacity of the alloy exceeded.

This situation will result when the load remains small over a prolonged period of time or when the fuel cell 5 ceases to operate. The valves 13, 15 and 16 are fully opened in this case to supply hydrogen gas from the storage container 1 and the alloy container 3 to the fuel cell 5. At this time, the operating condition is so adjusted that the power generation of the fuel cell 5 is in conformity with the electric load 10, and an excess of heat is accumulated by circulating the medium 7 of the accumulator 6 through the heat exchanger 9 of the fuel cell 5 by way of the medium inlet 32 and the medium outlet 33.

Furthermore, the valve 17 is completely closed with the valve 19 fully opened to circulate the medium 7 of the accumulator 6 through the heat exchanger 8 of the alloy container 3 via the medium inlet 30 and the medium outlet 31, thereby heating the alloy 4 for the desorption of hydrogen gas and rendering the alloy ready to absorb boil-off hydrogen gas. As a result, the excess of boil-off hydrogen gas, which was invariably discarded conventionally, can be utilized effectively as energy.

Incidentally, the medium inlet 36, valve 17, heat exchanger 8, heat medium piping 24, pump 21, medium outlet 31 and heat accumulator 6 provide the third piping channel. Further the medium inlet 36, heat medium pipe 39, valve 18, medium outlet 29 and heat accumulator 6 constitute the fourth piping channel.

The heat storage medium 7 within the accumulator 6 is always circulated through the heat exchanger 9 of the fuel cell 5 via the medium inlet 32 and the medium outlet 33 to thereby accumulate the exhaust heat of the fuel cell 5, and a portion of the heat is utilized as energy for heating the hydrogen absorbing alloy 4 for the desorption of hydrogen gas.

In accordance with the quantity of heat demanded by the thermal load 11 as for the supply of hot water, the heat storage medium 7 is also circulated through the load 11 via the medium inlet 35 and the medium outlet 34, and the medium is partly consumed by the load 11. Accordingly, the opening degree of the valves 18 and 20 is so adjusted as to supply the medium to the accumulator 6 in an adequate amount in conformity with the consumption of the medium 7 by the load 11 as for the supply of hot water.

Thus, the hydrogen storing and utilizing system of the present invention is adapted to recover the heat of reaction produced by the hydrogen absorbing alloy in absorbing flash hydrogen gas and boil-off hydrogen gas and store the heat in the accumulator for effective utilization, consequently realizing a high energy efficiency. Even if boil-off hydrogen gas is produced in an amount exceeding the storage capacity of the alloy, the heat accumulator is adapted to effectively store and utilize the gas in the form of heat without discarding the gas, and therefore assures great advantages not only in efficiency but also with respect to safety and reliability.

With the system of the invention described, the flash hydrogen gas to be produced when liquefied hydrogen is filled in and the boil-off hydrogen gas to be produced after the hydrogen has been filled in are stably stored in a hydrogen absorbing alloy container having a minimized hydrogen storage capacity required in conformity with the storage scale and load scale, and can therefore be utilized as energy with a high efficiency.

Additionally, fuel cells, which are adapted for highly efficient dual-purpose electricity and heat generation with use of hydrogen as a fuel, are made usable for meeting energy demands in cities and suburban areas. This assures an immense industrial value.

What is claimed is:

1. A system for storing and utilizing hydrogen comprising a liquefied hydrogen storage container to be filled with liquefied hydrogen, a hydrogen utilizing device operable by a supply of hydrogen gas, hydrogen gas piping interconnecting the hydrogen storage container and the hydrogen utilizing device, a hydrogen absorbing alloy container connected to an intermediate portion of the hydrogen gas piping and having a hydrogen absorbing alloy accommodated therein, a heat accumulator having a heat storage medium accommodated therein, first medium circulating means for circulating the heat storage medium between the hydrogen utilizing device and the heat accumulator, and second medium circulating means for circulating the heat storage medium between the alloy container and the heat accumulator.

2. A system for storing and utilizing hydrogen comprising a hydrogen storage device and a hydrogen utilizing device interconnected by hydrogen gas piping, the hydrogen storage device comprising:

a hydrogen absorbing alloy container, and a hydrogen absorbing alloy accommodated in the alloy container for absorbing flash hydrogen gas to be produced when liquid hydrogen is filled into a liquefied hydrogen storage container and boil-off hydrogen gas to be produced from the storage container after the container has been filled with the liquefied hydrogen, the system further comprising:

a heat accumulator having a heat storage medium accommodated therein, a first heat exchanger installed in the hydrogen utilizing device, a first piping channel for circulating the heat storage medium between the first heat exchanger and the heat accumulator, a second heat exchanger installed in the alloy container, a second piping channel for circulating the heat storage medium between the second heat exchanger and the heat accumulator, a third piping channel connected to the second piping channel for introducing a heat storage medium of low temperature into the second piping channel, and a fourth piping channel connected to the heat accumulator for introducing the heat storage medium of low temperature into the heat accumulator.

3. A system for storing and utilizing hydrogen as defined in claim 2 wherein the heat storage medium is water.

4. A system for storing and utilizing hydrogen as defined in claim 2 wherein the hydrogen utilizing device comprises a fuel cell and/or a hydrogen combustion device.

5. A system for storing and utilizing hydrogen as defined in claim 2 wherein the hydrogen absorbing alloy has an equilibrium hydrogen pressure not exceeding 1 MPa at 40° C.

6. A system for storing and utilizing hydrogen as defined in claim 2 wherein the hydrogen absorbing alloy has an equilibrium hydrogen pressure exceeding atmospheric pressure at 100° C.

7. A system for storing and utilizing hydrogen as defined in claim 2 wherein the hydrogen absorbing alloy has an equilibrium hydrogen pressure exceeding atmospheric pressure at the exhaust heat temperature level of the hydrogen utilizing device.

* * * * *